(12) United States Patent
Wilkinson

(10) Patent No.: US 9,135,481 B2
(45) Date of Patent: Sep. 15, 2015

(54) METHOD AND APPARATUS PERTAINING TO INSTALLATION OF AN RFID-TAG READER SYSTEM

(71) Applicant: Wal-Mart Stores, Inc., Bentonville, AR (US)

(72) Inventor: Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 183 days.

(21) Appl. No.: 13/803,690

(22) Filed: Mar. 14, 2013

(65) Prior Publication Data

US 2014/0266614 A1  Sep. 18, 2014

(51) Int. Cl.
| | |
|---|---|
| *H04Q 5/22* | (2006.01) |
| *G08B 13/14* | (2006.01) |
| *G06F 7/00* | (2006.01) |
| *G06K 7/10* | (2006.01) |
| *G08B 13/24* | (2006.01) |
| *G06Q 10/08* | (2012.01) |
| *G06Q 50/28* | (2012.01) |

(52) U.S. Cl.
CPC ........ *G06K 7/10356* (2013.01); *G06K 7/10475* (2013.01); *G06Q 10/08* (2013.01); *G08B 13/2462* (2013.01); *G06Q 50/28* (2013.01)

(58) Field of Classification Search
CPC .......... G06K 7/10356; G06K 7/10475; G06K 2017/0045; G06K 7/0008; G06K 17/0029; G06K 19/07749; G06K 7/10316; G06Q 10/08; G06Q 50/28; G06Q 10/087; G01S 5/06
USPC .............. 340/10.1, 10.52, 10.51, 10.5, 568.1, 340/572.1, 10.3, 572.2, 572.4, 572.7, 572.8, 340/539.1; 235/487, 492, 451, 385; 700/214, 229, 225, 95, 116, 213
See application file for complete search history.

(56) References Cited

U.S. PATENT DOCUMENTS

| | | | |
|---|---|---|---|
| 4,303,910 A | 12/1981 | McCann | |
| 4,595,915 A | 6/1986 | Close | |
| 4,888,579 A | 12/1989 | ReMine | |
| 5,055,659 A | 10/1991 | Hendrick | |
| 5,119,104 A | 6/1992 | Heller | |
| 5,737,193 A | 4/1998 | LaRiviere | |
| 6,046,683 A | 4/2000 | Pidwerbetsky | |
| 6,204,765 B1 | 3/2001 | Brady | |

(Continued)

FOREIGN PATENT DOCUMENTS

| | | |
|---|---|---|
| WO | 9700503 | 1/1997 |
| WO | 0014694 | 3/2000 |

OTHER PUBLICATIONS

U.S. Appl. No. 13/804,970, filed Mar. 14, 2013, Wilkinson.

(Continued)

*Primary Examiner* — Mirza Alam
(74) *Attorney, Agent, or Firm* — Fitch, Even, Tabin & Flannery LLP

(57) ABSTRACT

One or more RFID-tag readers are operably coupled to one or more RFID-tag reader antennas that are installed to primarily read RFID tags in a given hallway. Accordingly, at least a majority of the area within storage spaces that border the given hallway are without sufficient reader energy to power those RFID tags. Accordingly, many, most, or even all of the items that are stored in the storage space will receive insufficient reader energy to power their corresponding RFID tags.

18 Claims, 4 Drawing Sheets

(56) References Cited

U.S. PATENT DOCUMENTS

| | | |
|---|---|---|
| 6,662,068 B1 | 12/2003 | Ghaffari |
| 6,804,578 B1 * | 10/2004 | Ghaffari .................. 700/229 |
| 6,903,656 B1 | 6/2005 | Lee |
| 7,245,220 B2 | 7/2007 | Haller |
| 7,667,602 B2 | 2/2010 | Ulrich |
| 7,952,480 B1 * | 5/2011 | Kuzma et al. ............ 340/572.1 |
| 8,669,915 B2 | 3/2014 | Wilkinson |
| 2005/0040232 A1 | 2/2005 | Maloney |
| 2005/0076816 A1 | 4/2005 | Nakano |
| 2005/0168385 A1 | 8/2005 | Baker |
| 2005/0278062 A1 * | 12/2005 | Janert et al. ............ 700/214 |
| 2007/0008071 A1 | 1/2007 | Hansen |
| 2007/0135961 A1 * | 6/2007 | Ishida et al. ............ 700/213 |
| 2007/0200701 A1 * | 8/2007 | English et al. ............ 340/572.1 |
| 2007/0222606 A1 | 9/2007 | Phipps |
| 2008/0174432 A1 | 7/2008 | Ulrich |
| 2009/0280741 A2 | 11/2009 | Krinsky |
| 2009/0309704 A1 * | 12/2009 | Chang et al. .............. 340/10.1 |
| 2010/0164710 A1 * | 7/2010 | Chung et al. ............ 340/539.1 |
| 2010/0172502 A1 * | 7/2010 | Jones et al. ................ 380/277 |
| 2011/0249831 A1 * | 10/2011 | Bellamy .................... 381/94.1 |
| 2012/0086553 A1 | 4/2012 | Wilkinson |

OTHER PUBLICATIONS

EPCglobal; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.

Lindsay et al.; Retail RFID Systems without Smart Shelves; published at http://www.jefflindsay.com/rfid1.shtml; 9 pages; Nov. 7, 2003.

NAVSUP; Naval Supply Systems Command, Final Report of the Passive Radio-Frequency Identification (RFID) Project at the Fleet and Industrial Supply Center, Norfolk, Virginia, Ocean Terminal; 31 pages, Oct. 20, 2004.

PCT; App. No. PCT/US2008/051378; International Search Report mailed Oct. 7, 2008; 3 pgs.

PCT; App. No. PCT/US2014/026522; International Search Report mailed Jul. 25, 2014.

PCT; App. No. PCT/US2014/026522; Written Opinion mailed Jul. 25, 2014.

* cited by examiner

METHOD AND APPARATUS PERTAINING TO INSTALLATION OF AN RFID-TAG READER SYSTEM

TECHNICAL FIELD

This invention relates generally to radio-frequency identification (RFID) tag reader systems and more particularly to antenna placement for such readers.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

Many prior art methodologies provide for installing RFID tag readers (and in particular the antennas for such readers) at certain chokepoints through which most or all tagged items might be expected to pass. Other approaches are more aggressive and provide for effectively saturating a given facility with radio frequency energy in an effort to be able to read any RFID tag, any time, at any location within that facility. While effective to some degree, both such approaches are not wholly suitable to meet all needs of all potential users of such systems.

Building a system that attempts to illuminate every location within a given facility, for example, presents a very difficult challenge (in no small part due to maximum power limitations imposed on RFID tag readers by regulation and/or law and further by the fact that the operating environment will often tend to be highly dynamic with various bodies and surfaces moving from one location to another with corresponding effects upon the radio frequency environment from one spot to another). Accordingly, such an approach can represent both a considerable cost and also one that is subject to numerous frailties of the moment engendered by the dynamics of the application setting.

BRIEF DESCRIPTION OF THE DRAWINGS

The above needs are at least partially met through provision of the method and apparatus pertaining to installation of RFID tag reader antennas described in the following detailed description, particularly when studied in conjunction with the drawings, wherein.

Figure 1:
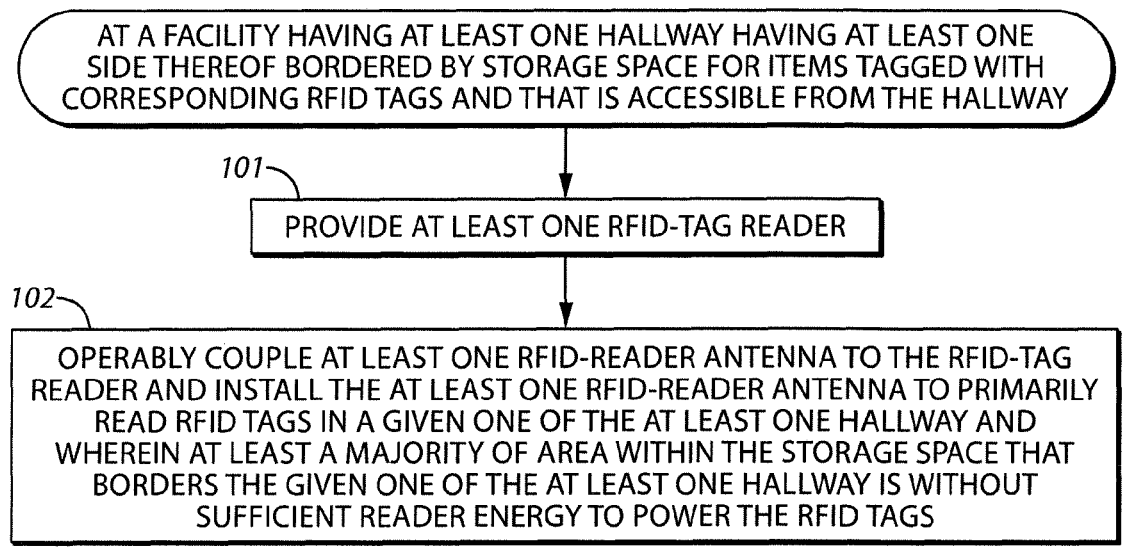
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these teachings are suitable for use at a facility having at least one hallway having at least one side thereof bordered by storage space for items that are tagged with corresponding RFID tags and that are accessible from that hallway. In particular, these teachings provide for providing at least one RFID-tag reader and for operably coupling that RFID-tag reader to one or more RFID-tag reader antennas that are installed to primarily read RFID tags in a given one of the aforementioned hallways. That said, at least a majority of the area within the aforementioned storage space that borders that hallway is to be without sufficient reader energy to power those RFID tags. Accordingly, many, most, or even all of the items that are stored in the storage space will receive insufficient reader energy to power their corresponding RFID tags.

So configured, the RFID tags for stored items will tend to receive enough reader power upon being removed from the storage space and moved into the corresponding hallway to permit the RFID tag to be read by the aforementioned RFID-tag reader. The applicants have determined that although such an approach leaves the RFID-based infrastructure effectively blind with respect to being able to read RFID tags on items that are stored in such a storage space, the likely present location of most items can nevertheless be reliably understood in many cases as can the in-motion state of such items.

These teachings are highly flexible in practice and will accommodate a wide variety of modification. By one approach, for example, an RFID tag reader antenna can be placed at either end of such a hallway. Both antennas can be faced inwardly (i.e., more or less towards one another) and therefore have largely overlapping coverage areas. Both such antennas can feed a shared RFID-tag reader if desired.

So configured, many styles of RFID tags will lose power when placed in the aforementioned storage spaces. Presuming those tags remain powered down for a sufficient period of time (which can and will vary from tag to tag), many such tags will switch their so-called inventory state and hence will be primed to respond to an RFID-tag reader when next powered up. Accordingly, when the item having such a tag is eventually removed from the storage space and brought into the hallway, the tag will likely power up and speak up, making its presence (and hence the presence of the item) known to the reader. Given these various described circumstances, it can be intuited from a single read (at least in many cases) that the corresponding item is not only in that particular hallway but that the item is on the move. That movement status information, in turn, can be leveraged in a variety of ways to help manage inventory information for the items in such a facility.

These and other benefits may become clearer upon making a thorough review and study of the following detailed description. Referring now to the drawings, and in particular to FIG. 1, an illustrative process 100 that is compatible with many of these teachings will now be presented.

Figure 2:
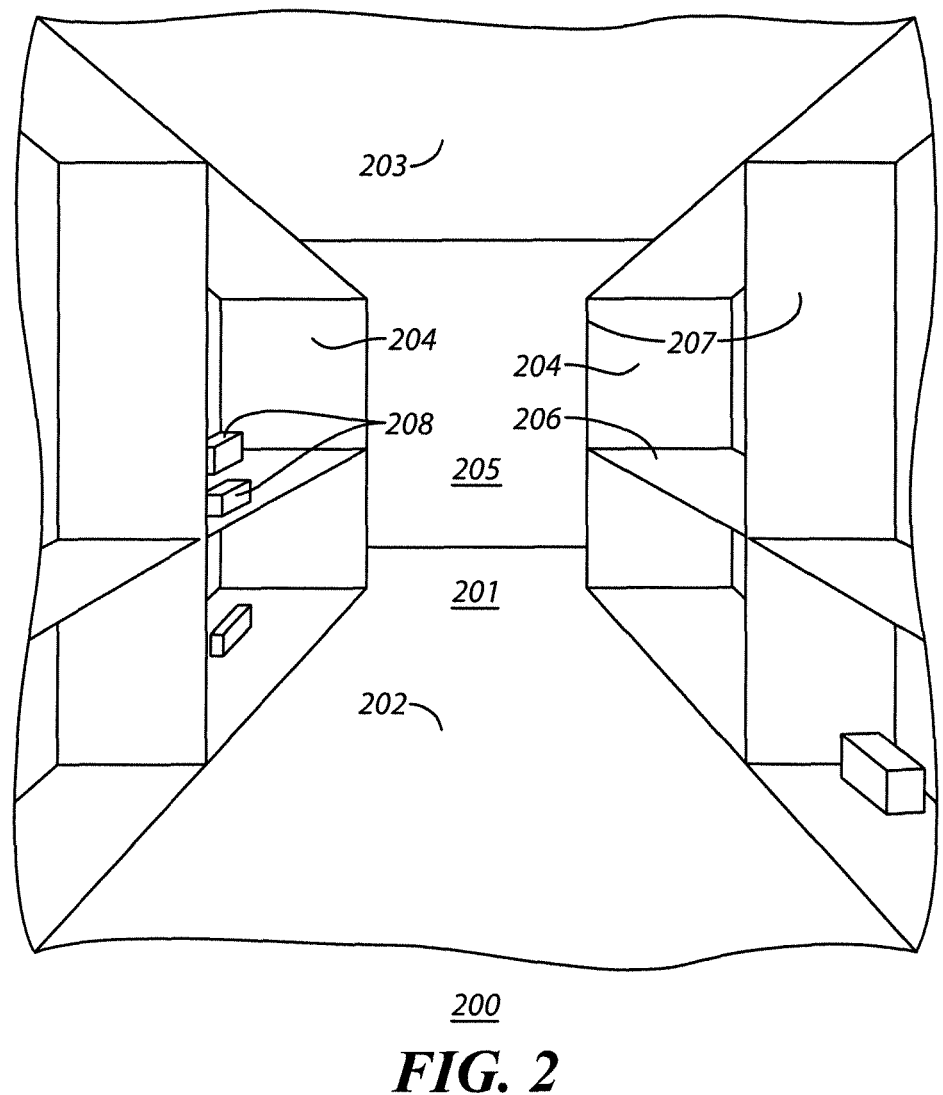
FIG. 2 comprises a perspective schematic view as configured in accordance with various embodiments of the invention.

With momentary reference to FIG. 2, this process 100 can be carried out at a facility 200 (such as, for example, a retail establishment, a distribution center, a warehouse, and so forth) having one or more hallways 201. These hallways 201 are generally defined by a floor 202 and a ceiling 203 (comprised of virtually any useful material in such regards) and on one or both sides by bordering storage space 204.

In this example there are also walls proximal both ends of the hallway 201 with one such wall 205 being visible in this figure. (In this particular illustrative example the hallway 201 joins a perpendicular hallway (unnumbered) formed, in part, by the latter wall 205.) That said, for the purposes of this description it will be presumed that the "hallway" is defined by the bordering structures on its sides (i.e., the storage spaces 204 in this example) and by the floor 201. Accordingly, the ceiling 203 and the identified wall(s) 205 can be as close, or as distant, from the aforesaid elements without greatly impacting the essential boundaries of the "hallway" itself.

The storage space 204 can vary from one application setting to another. In this particular example the storage space 204 includes shelves (some of which are denoted by reference numeral 206) and side walls (some of which are denoted by reference numeral 207). The shelves 206 are "open front" in that there are no doors, rolling shutters, curtains, or other enclosures on the front of the shelves 206. Accordingly, the illustrated storage space 204 is quite typical of many so-called backroom and warehouse storage spaces.

That said, these teachings will readily accommodate other approaches in these regards including storage space that can be partially or wholly enclosed by use of doors or the like. If desired, these teachings will also accommodate storage space 204 that employs one or more sliding drawers, trays, or the like that selectively move into and out of the confines of the storage space enclosure as desired.

The relative dimensions of this storage space 204 and the hallway 201 can vary with the application setting. By one approach the storage space 204 can be anywhere from two to four feet deep (and often at least thirty-six inches deep) and six to ten feet high while the hallway 201 can be anywhere from four feet to eight feet in width. The length of the storage space 204 (and hence the corresponding length of the hallway 201) can vary as well but will often be at least thirty feet in length with a length of fifty feet or so not being uncommon.

These teachings will accommodate storage space 204 and hallway 201 dimensions that presume that, for the most part, access to the storage space will be by associates using only their hands and appropriate platforms such as ladders. These teachings will also accommodate, however, sizing the foregoing elements to permit the use of equipment such as forklifts and the storage of standard-sized pallets in the storage space 204 if desired.

This storage space 204, of course, serves as a place to store any of a variety and number of items 208. When this storage space 204 comprises, for example, a backroom storage space for a large retailer, these items 208 could comprise a variety of retail goods including but not limited to groceries, health and beauty products, paper products, automotive supplies, sporting goods, clothing and shoes, books, seasonal offerings, and so forth. In some cases a single such item 208 might occupy an entire shelf 206 while in other cases a given shelf 206 might contain dozens or even hundreds of items 208 that are stacked and/or nested as possible.

The materials that comprise these storage spaces 204 can and will vary from application setting to application setting, and will often represent various combinations of such materials as various metals (including aluminum and steel), various plant-based materials (such as wood, laminated wood products, and engineered wood products), and any of a variety of plastic materials. Accordingly, a given storage space 204 can be comprised, in some cases, either entirely or at least in substantial part of electrically-shielding materials.

These long, relatively-narrow hallways, the relatively deep and tall storage spaces, the variety of materials used to form the storage spaces, and the variable number and type of items that can be stored (in any of a variety of packing arrangements) all contribute to creating a challenging environment if seeking to illuminate a substantial portion of these storage spaces 204 with sufficient power to reliably read RFID tags associated with the stored items 208. Fortunately, pursuant to the present teachings, such a goal need not be met and instead is avoided. In particular, these teachings provide for creating a radio-frequency environment where at least a majority of the area with such storage spaces 204 is without sufficient reader energy to power such RFID tags.

Figure 3:
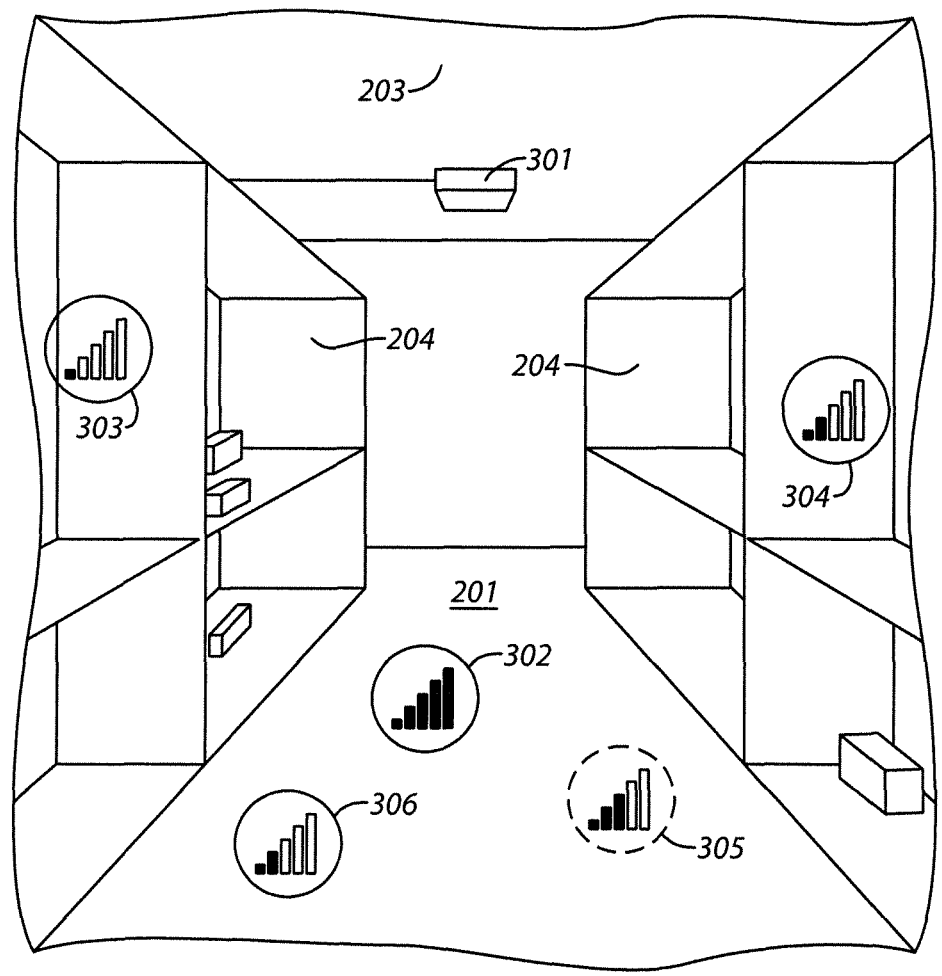
FIG. 3 comprises a perspective schematic view as configured in accordance with various embodiments of the invention.

Referring now to FIGS. 1 and 3, at 101 this process 100 provides at least one RFID-tag reader (not shown in these figures) at the aforementioned facility 200. A variety of such RFID-tag readers are known in the art and often will each accommodate a plurality of discrete RFID-tag reader antennas. In many application settings the facility will have a plurality of such RFID-tag readers. This RFID-tag reader can be mounted in any desired location though often will be installed relatively close to its antennas. Accordingly, such an RFID-tag reader can be installed, for example, on either side of the ceiling 203 of the facility 200, on a nearby wall of the facility 200, or elsewhere as convenient and appropriate.

At 102 this process 100 then provides for operably coupling at least one RFID-tag reader antenna 301 to the aforementioned RFID-tag reader. More particularly, this RFID-tag reader antenna 301 is installed (for example, directly on or suspended from the facility ceiling 203) to primarily read RFID tags in the aforementioned hallway 201. As used in this statement, the word "primarily" will be understood to refer to the effective reading coverage area engendered by this particular antenna 301; i.e., the three-dimensional volume within which the radiated radio-frequency energy 302 is, at least for the most part, of sufficient magnitude to power up one of the ordinary RFID tags used at the facility for at least the bulk of their tagged items. It will be understood that this power level will not be consistent throughout this coverage area (for example, as denoted at reference numeral 305, the power level at one area within the coverage area may be less than other areas but still sufficient in and of itself to power up an RFID tag). For many application settings, a suitable power level will be −15 dbm and above.

It will also be understood that the effective coverage area can itself include not only hot spots of higher energy but also nulls (as denoted by reference numeral 306) where the local energy level is too low to power an RFID tag as described. Nulls and hot spots are the result of the radio-frequency energy reflecting off various surfaces and constructively interfering (hence producing hot spots) or destructively interfering (hence producing nulls). The nulls and hot spots alternate within a wave length. The presence of such nulls within such a volume shall be understood to not alter a fair characterization of such a volume as being within the effective reading coverage area.

Since the RFID-tag reader antenna 301 is installed to primarily read RFID tags in the aforementioned hallway 201, at least a majority of the area within the aforementioned storage space(s) 204 that border the hallway 201 is without sufficient reader energy (as denoted, for example, at reference numerals 303 and 304) to power the RFID tags. This is not to say that some small locations within the storage space 204 will not have a sufficient level of reader energy to power an RFID tag. In general, however, most (if not all) of the storage space 204 will be dark to the RFID-tag reader antenna 301 and hence to the RFID-tag reader. Accordingly, RFID tags placed in the storage space 204 will likely lack power and will assume an unpowered state.

For the sake of illustration and without intending any specific precise limitation in these regards, per this process 100 the RFID-tag reader antenna 301 may be of a type, and may be oriented, and may have a particular transmission power level and beam shape such that at least about seventy percent of the hallway's volume receives adequate levels of reader energy while no more than about fifteen percent of the storage space's volume receives adequate levels of reader energy. Generally speaking, the less energy that reaches the confines of the storage space 204, the better.

Figure 4:
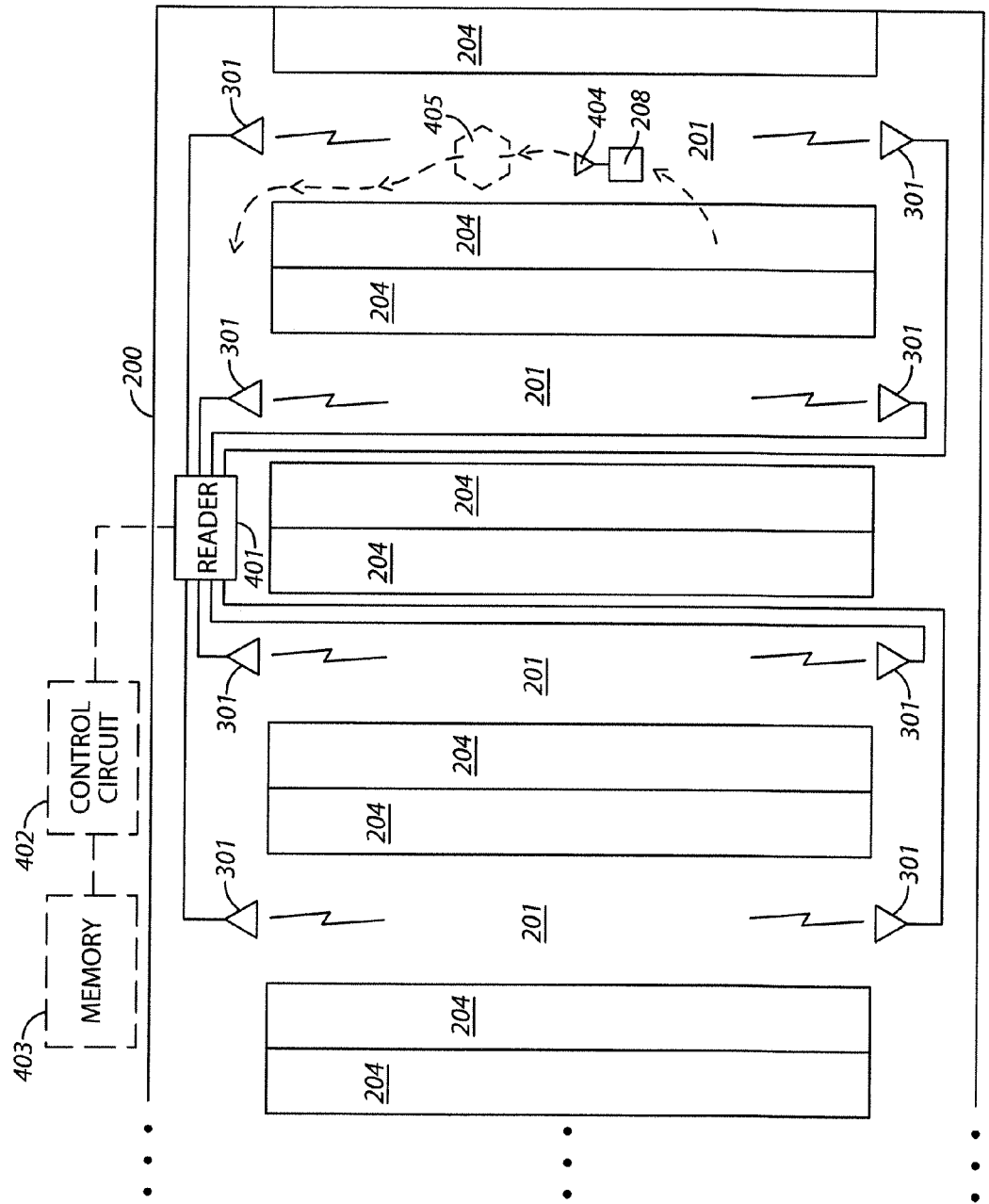
FIG. 4 comprises a top plan block diagram view as configured in accordance with various embodiments of the invention.

FIG. 4 offers further details regarding a particular instantiation of the present teachings. It will again be understood that no particular limitations are intended by way of the specific details of this example.

In this example the facility 200 includes at least four hallways 201 as generally described above. In this example, both sides of each hallway borders a storage space 204, also as generally described above. Each of these hallways 201 has two of the above-described RFID-tag reader antennas 301. Each such pair of antennas 301 are spaced apart from one another by at least thirty feet (and, in this example, by approximately fifty feet) facing inwardly towards one another. So configured, each pair of RFID-tag reader antennas 301 have substantially overlapping coverage areas and form a combined coverage zone. Again, it will be understood that reader power levels are unlikely to be consistent throughout the combined coverage zone and in fact the latter is likely characterized by numerous coverage hot spots and nulls.

So configured, each of the four illustrated hallways 201 has a pair of RFID-tag reader antennas 301 that both primarily read RFID tags in each corresponding hallway 201 without also illuminating any considerable portion of the bordering storage spaces 204 to any significant extent.

In this example each of the illustrated RFID-tag reader antennas 301 connects (typically via an appropriate length of coaxial cabling or the like) to a shared RFID-tag reader 401. The RFID-tag reader 401 in turns uses these antennas to read RFID tags per the protocol(s) selected for use at the facility 200. The RFID-tag reader 401 operably couples (via a wireless and/or a non-wireless link) to a control circuit 402. Such a control circuit 401 can comprise a fixed-purpose hard-wired platform or can comprise a partially or wholly programmable platform. These architectural options are well known and understood in the art and require no further description here. This control circuit 401 is configured (for example, by using corresponding programming as will be well understood by those skilled in the art) to carry out any of a variety of desired actions and functions. Examples include, but are not limited to, sorting and otherwise processing RFID tag information as gleaned by the RFID-tag reader 401 and preparing corresponding alerts and reports, instructing the RFID-tag reader to carry out any of a variety of read activities, and so forth.

If desired, this control circuit 402 can operably couple to an optional memory 403. The memory 403 may be integral to the control circuit 402 or can be physically discrete (in whole or in part) from the control circuit 402 as desired. This memory 403 can also be local with respect to the control circuit 402 (where, for example, both share a common circuit board, chassis, power supply, and/or housing) or can be partially or wholly remote with respect to the control circuit 402 (where, for example, the memory 403 is physically located in another facility, metropolitan area, or even country as compared to the control circuit 402).

This memory 403 can serve, for example, to store data regarding read RFID tags. This memory 403 can also serve to non-transitorily store the computer instructions that, when executed by the control circuit 402, cause the control circuit 402 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

As noted above, a tagged item 208 stored in one of the aforementioned storage spaces 204 will likely not receive enough reader energy to maintain the RFID tag 404 in a powered state. Presuming that the RFID tag 404 comprises an EPC code, eventually the RFID tag 404 will change its inventory state as a result of being without power.

At this point it may be useful to note that each EPC-compliant tag has two states: "A" and "B." The "A" state comprises the default state and hence represents the tag's state when initially powering up. Once a tag has been read its state changes from "A" to "B." During the "A" state a tag will respond to any reader that offers a session "A" query. During the "B" state the tag will not again respond to a reader using the same session query. EPC's four different sessions provide for differences with respect to how a read tag persists a "B" state. In Session "0" a read tag will persist this "B" state until power is lost and then the tag reverts immediately to the "A" state. In Session "1" a read tag will persist its "B" state for a period of time ranging from 500 ms to 5 seconds and will then automatically revert to the "A" state. In Session "2" and "3" a read tag will remain in the "B" state until power is lost. Then, once power is lost, the read tag will persist its "B" state for at least an additional 2 seconds (the actual persistence duration is left to the manufacturer and can reach minutes in some cases).

Again, however, almost regardless of the specifics of the EPC RFID tag 404 in these regards, the tag 404 for a given stored item 208 is likely in most application settings to be stored long enough in the described low-power environment for the tag's inventory state to revert to an "A" state. Accordingly, if and when that item 208 is eventually removed from the storage space 204 and into the hallway 201, the RFID tag 404 for that item 208 is likely, sooner or later as the item 208 moves one way or the other in the hallway 201, to pass through an area (such as the hotspot denoted by reference numeral 405) having sufficient reader energy to power up the RFID tag 404 and to prompt the tag 404 to be read by the RFID-tag reader 401.

In some cases, of course, the RFID tag 404 may be powered up and read immediately upon being removed from the storage space 204. The above description, however, serves the point of emphasizing that even a hallway 201 having only somewhat spotty coverage is nevertheless likely to have hotspots through which the item/tag is likely to pass.

It is possible, of course, for a given RFID tag 404 in such an application setting to become powered up for only short intermittent durations of time as the item 208 is removed from the storage space 204 and moved down the hallway 201 through nulls and hotspots to a new location. Accordingly, there may be only a few intermittent opportunities for the RFID-tag reader 401 to actually read that RFID tag 404.

Those intermittent opportunities may only last for a fraction of a second as a given RFID tag moves through a hot spot. It will therefore be appreciated that such an RFID tag cannot compete with many other RFID tags for the opportunity to communicate with the RFID-tag reader 401 given that limited opportunity. Pursuant to the present teachings, however, the likelihood of the RFID tag 404 being heard under such circumstances is considerably improved by having the RFID system systemically ignore the contents of the storage spaces 204 through an inherent and designed-in inability to illuminate that space 204 with sufficient power to read RFID tags. By removing that population of stored RFID tags from contention the odds are considerably improved that the RFID system will actually be able to "hear" an RFID tag 404 that re-enters the hallway 201 on the way to some other location.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one illustrative example in these regards, in the examples provided above the storage spaces 204 on either side of the hallway 201 were of equal length and were coextensive with one another as well. These teachings will readily accommodate, however, application settings where such symmetry does not prevail.

I claim:

1. A method for use with a facility having a plurality of hallways that each have at least one side thereof bordered by storage space for items tagged with corresponding radio-frequency identification (RFID) tags and that is accessible from corresponding hallway, the RFID tags each having at least two states with a first state comprising a default state to which the RFID tag defaults when initially powering up and a second state comprising a state to which the RFID tag switches upon having been read, the method comprising:
providing at least one RFID-tag reader;
operably coupling at least two RFID-tag reader antennas to the at least one RFID-tag reader and installing at least one of the RFID-tag reader antennas in a first of the plurality of the hallways and another of the RFID-tag reader antennas in a second of the plurality of the hallways, such that the RFID-tag reader antennas provide effective coverage areas to power the RFID tags within respective hallways where effective coverage areas include both hot spots of higher energy as well as nulls and wherein at least a majority of area within the storage space that borders the first of the plurality of the hallways and the storage space that borders the second of the plurality of the hallways is without sufficient reader energy to power the RFID tags.

2. The method of claim 1 wherein operably coupling at least one RFID-tag reader antenna to the RFID-tag reader comprises operably coupling at least two RFID-tag reader antennas to the RFID-tag reader, and wherein installing the at least one RFID-tag reader antenna comprises installing the at least two RFID-tag reader antennas to both primarily read RFID tags in a given one of at least one hallway.

3. The method of claim 2 wherein installing the at least two RFID-tag reader antennas comprises installing the two RFID-tag reader antennas such that the two RFID-tag reader antennas have overlapping coverage areas and form a combined coverage zone characterized by numerous coverage hot spots and nulls.

4. The method of claim 3 wherein the RFID-tag reader antennas that comprise the at least two RFID-tag reader antennas are spaced at least thirty feet apart.

5. The method of claim 4 wherein the RFID-tag reader antennas that comprise the at least two RFID-tag reader antennas are spaced approximately fifty feet apart.

6. The method of claim 1 wherein the storage space comprises, at least in part, open-front shelving.

7. The method of claim 6 wherein the storage space is comprised, at least in part, of electrically-shielding materials.

8. The method of claim 6 wherein the open-front shelving is at least thirty-six inches deep.

9. The method of claim 8 wherein the hallways are at least thirty feet in length.

10. A apparatus comprising:
a facility having a plurality of hallways that each have at least one side thereof bordered by storage space for items tagged with corresponding radio-frequency identification (RFID) tags and that is accessible from corresponding hallway, the RFID tags each having at least two states with a first state comprising a default state to which the RFID tag defaults when initially powering UP and a second state comprising a state to which the RFID tag switches upon having been read;
at least one RFID-tag reader;
at least two RFID-tag reader antennas operably coupled to the at least one RFID-tag reader and installing at least one of the RFID-tag reader antennas in a first of the plurality of the hallways and another of the RFID-tag reader antennas in a second of the plurality of the hallways, such that the RFID-tag reader antennas provide effective coverage areas to power the RFID tags within respective hallways where effective coverage areas include both hot spots of higher energy as well as nulls and wherein at least a majority of area within the storage space that borders the first of the plurality of the hallways and the storage space that borders the second of the plurality of the hallways is without sufficient reader energy to power the RFID tags.

11. The apparatus of claim 10 further comprising at least two RFID-tag reader antennas that both operably couple to the RFID-tag reader, wherein both of the at least two RFID-tag reader antennas are configured to both primarily read RFID tags in a given one of at least one hallway.

12. The apparatus of claim 11 wherein the two RFID-tag reader antennas have overlapping coverage areas and form a combined coverage zone characterized by numerous coverage hot spots and nulls.

13. The apparatus of claim 12 wherein the at least two RFID-tag reader antennas are spaced at least thirty feet apart.

14. The apparatus of claim 13 wherein the at least two RFID-tag reader antennas are spaced approximately fifty feet apart.

15. The apparatus of claim 10 wherein the storage space comprises, at least in part, open-front shelving.

16. The apparatus of claim 15 wherein the storage space is comprised, at least in part, of electrically-shielding materials.

17. The apparatus of claim 15 wherein the open-front shelving is at least thirty-six inches deep.

18. The apparatus of claim 17 wherein the hallways are at least thirty feet in length.

* * * * *